United States Patent
Jung

[19]

[11] Patent Number: 5,909,555
[45] Date of Patent: Jun. 1, 1999

[54] METHOD AND SYSTEM FOR SUPPORTING DATA COMMUNICATION BETWEEN PERSONAL COMPUTERS USING AUDIO DRIVERS, MICROPHONE JACKS, AND TELEPHONE JACKS

[75] Inventor: Sung-Ho Jung, Seoul, Rep. of Korea

[73] Assignee: SamSung Electronics Co., Ltd., Kyungki-do, Rep. of Korea

[21] Appl. No.: 08/789,480

[22] Filed: Jan. 27, 1997

[30] Foreign Application Priority Data

Jan. 26, 1996 [KR] Rep. of Korea .................. 96-1752

[51] Int. Cl.$^6$ .................................................. H04L 12/40
[52] U.S. Cl. .................................. 395/200.83; 395/200.76; 395/892
[58] Field of Search ........................... 395/200.3, 200.76, 395/200.83, 500, 889, 892, 893, 894

[56] References Cited

U.S. PATENT DOCUMENTS

| | | | |
|---|---|---|---|
| 3,638,195 | 1/1972 | Brender et al. ...................... | 340/172.5 |
| 3,988,716 | 10/1976 | Fletcher et al. ...................... | 340/172.5 |
| 4,125,872 | 11/1978 | Maxwell .................................. | 364/900 |
| 4,348,740 | 9/1982 | White ...................................... | 364/900 |
| 4,348,744 | 9/1982 | White ...................................... | 364/900 |
| 4,750,109 | 6/1988 | Kita ......................................... | 364/200 |
| 4,999,768 | 3/1991 | Hirokawa ............................... | 364/200 |
| 5,057,998 | 10/1991 | Hirokawa ............................... | 364/200 |
| 5,157,769 | 10/1992 | Eppley et al. .......................... | 395/200 |
| 5,287,455 | 2/1994 | Rosenthal ............................... | 395/200 |
| 5,321,817 | 6/1994 | Feinstine ................................ | 395/325 |
| 5,349,675 | 9/1994 | Fitzgerald et al. ...................... | 395/800 |
| 5,357,610 | 10/1994 | Takai ...................................... | 395/200 |
| 5,438,671 | 8/1995 | Miles ...................................... | 395/200 |
| 5,504,864 | 4/1996 | Berg .................................... | 395/200.01 |
| 5,530,894 | 6/1996 | Farrell et al. .......................... | 395/800 |
| 5,559,963 | 9/1996 | Gregg et al. ....................... | 395/200.13 |
| 5,572,677 | 11/1996 | Luther et al. ...................... | 395/200.04 |
| 5,638,521 | 6/1997 | Buchala et al. ......................... | 395/311 |
| 5,790,816 | 8/1998 | Fok et al. ................................ | 395/309 |
| 5,799,067 | 8/1998 | Kikinis et al. ........................ | 379/93.06 |

Primary Examiner—Lance Leonard Barry, Esq.
Attorney, Agent, or Firm—Robert E. Bushnell, Esq.

[57] ABSTRACT

A method and system for supporting data communication from a first computer system to a second computer system, with each of the first and second computer systems having a main computer section for performing computer functions and an audio driver for supporting an audio function by activating operation of first and second audio drivers of the respective first and second computer systems; supplying data from the main computer section of the first computer system to be transmitted to the second computer system to the first audio driver in response to a request of data transmission from the first computer system to the second computer system; temporarily storing the data supplied from the main computer section in a first buffer of the first audio driver; and converting the data stored in the first buffer into an analog signal. The analog signal is transmitted through a phone output jack of the first audio driver to a microphone input jack of the second computer system; and a determination is made about whether the second audio driver of the second computer system has been activated to receive the analog signal transmitted from the first computer system. The analog signal that has been transmitted through the microphone input jack is received when the second audio driver of the second computer system has been activated and the analog signal received from the microphone input jack is converted into a digital signal and the digital signal is temporarily stored in a second buffer of the second driver read by the main computer section of the second computer system. As a result, the audio driver as incorporated in one computer system not only supports the audio function, but also permits data communication with another computer system assuming that the second computer system also includes the same audio driver.

14 Claims, 4 Drawing Sheets

METHOD AND SYSTEM FOR SUPPORTING DATA COMMUNICATION BETWEEN PERSONAL COMPUTERS USING AUDIO DRIVERS, MICROPHONE JACKS, AND TELEPHONE JACKS

CROSS REFERENCE TO RELATED APPLICATION

This application makes reference to, incorporates the same herein, and claims all benefits accruing under 35 U.S.C. §119 from an application for *A Method For Supporting Data Communication Between Personal Computer Using Audio Drivers* earlier filed in the Korean Industrial Property Office on Jan. 26, 1996, and there duly assigned Ser. No. 1996/1752.

BACKGROUND OF THE INVENTION

1. Technical Field

The present invention relates to a method for supporting data communication between personal computers without the use of a data modem and, more particularly, to a personal computer using an audio driver for supporting data communication with the use of a data modem.

2. Background Art

In general, data communication between two personal computers is typically performed by way of either an internal data transfer interface as disclosed, for example, in U.S. Pat. No. 3,638,195 for *Digital Communication Interface* issued to Brender et al., U.S. Pat. No. 4,999,768 for *Data Transfer Control Units Each for Which Comprises Processors And Dual-Part Memory* and U.S. Pat. No. 5,057,998 for *Data Transfer Control Unit* both issued to Hirokawa, or by a modem such as disclosed, for example, in U.S. Pat. No. 5,357,610 for *Method For Parallel Data Transmission Using A Serial Data Transmission Data* issued to Takai. When a data transfer interface is installed in each computer, transmission cable having a data line and a control line is connected to a serial input/output interface unit of the respective data transfer interface to support data communication between the two computers. The data transfer interface is also equipped with a dedicated controller and a dual port memory for making preparation of data transfer from internal memory board of one personal computer to another personal computer. Modem can also be used to support data communication between such personal computers.

In addition to supporting a variety of data communications, personal computer also includes a variety of functions, such as a sound, an image display, a multimedia, wire/wireless communication and the like. To support good quality of sounds for the personal computer, a sound card (e.g., an audio driver) must be installed in the personal computer. This sound card is provided to support only audio function for the computer. For example, an audio (e.g., voice) signal from an microphone input jack is converted into a digital signal by means of the sound card to be stored in a memory unit of the personal computer. The digital signal is also converted into an analog signal by means of the sound card to be supplied to a phone output jack. It is noted, however, that the audio driver as practiced in the contemporary computer art is solely limited to support audio output in the personal computer.

SUMMARY OF THE INVENTION

It is therefore an object of the present invention to provide an improved personal computer and method for supporting data communication with another personal computer without the use of a data modem.

It is another object of the present invention to provide a personal computer having an audio driver incorporated therein for supporting data communication with another personal computer without the use of a data modem.

These and other objects of the present invention can be achieved by a method for supporting data communication from a first computer system to a second computer system, each of the first and second computer systems having a main computer section for performing computer functions and an audio driver for supporting an audio function. The method includes the steps of: activating operation of first and second audio drivers of the respective first and second computer systems; supplying data from the main computer section of the first computer system to be transmitted to the second computer system to the first audio driver in response to a request of data transmission from the first computer system to the second computer system; temporarily storing the data supplied from the main computer section in a first buffer of the first audio driver; converting the data stored in the first buffer into an analog signal; transmitting the analog signal through a phone output jack of the first audio driver to a microphone input jack of the second computer system; determining whether the second audio driver of the second computer system has been activated to receive the analog signal transmitted from the first computer system; receiving the analog signal transmitted through the microphone input jack, when the second audio driver of the second computer system has been activated; converting the analog signal received from the microphone input jack into a digital signal and temporarily storing the digital signal in a second buffer of the second audio driver; and reading the digital signal stored in the second buffer of the second audio driver for transfer into the main computer section, and storing the digital signal read from the second buffer into the main computer section of the second computer system. As a result of such novel method, the audio driver as incorporated in one computer system not only supports the audio function but also permits data communication with another computer system having the same audio driver incorporated therein.

The present invention is more specifically described in the following paragraphs by reference to the drawings attached only by way of example.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
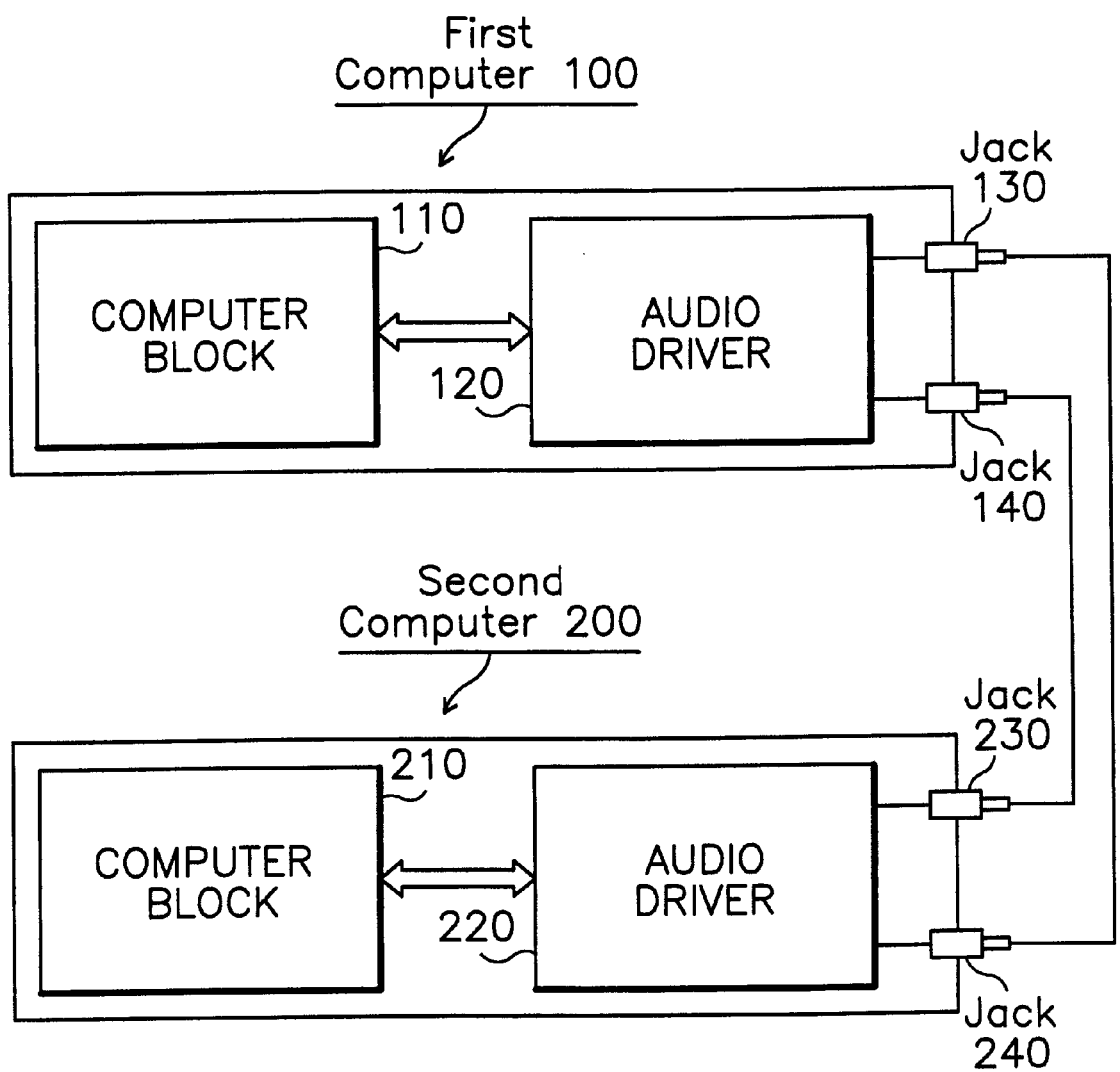
FIG. 1 is a schematic block diagram showing a connection configuration between two personal computers each having an audio driver incorporated therein for data communication according to the principles of the present invention.

Referring now to the drawings and particularly FIG. 1 which illustrates a connection configuration between two personal computers each having an audio driver incorporated therein for data communication according to the principles of the present invention. Each of the two personal computers (i.e., first and second computers) 100 and 200 includes a computer block 110 or 210 on which a variety of circuit units are located to perform computer function such as data processing or the like, and an audio driver 120 or 220 for supporting an audio function for the personal computer. For example, the first computer 100 as shown in FIG. 1 has the computer block 110 and the audio driver 120. The audio driver 120 is provided with a phone output jack 130 and a microphone input jack 140. The phone output jack 130 is used to convert an analog signal from the audio driver 120 into a sound (e.g., voice) signal, and the microphone input jack 140 to convert a sound signal into an analog signal.

The phone output jack 130 of the first computer 100 is connected to the microphone input jack 240 of the second computer 200 and the phone output jack 230 of the second computer 200 is connected to the microphone input jack 140 so that data-communication between the first and the second computers 100 and 200 can be performed in accordance with the principles of the present invention.

Figure 2:
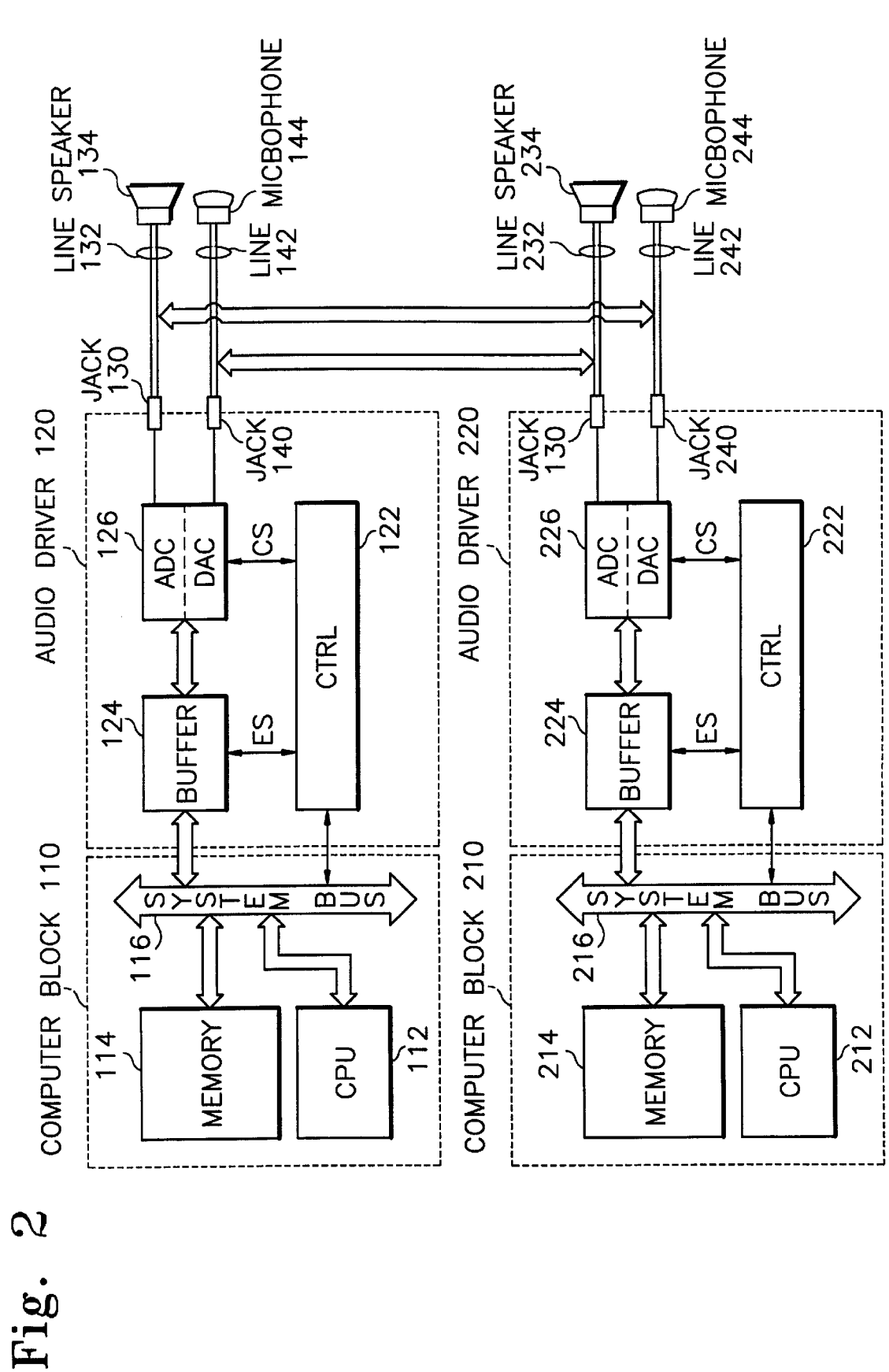
FIG. 2 is a schematic block diagram showing the detail of the connection configuration between two personal computers as shown in FIG. 1.

FIG. 2 illustrates the detail of the connection configuration between two personal computers as shown in FIG. 1. For example, the computer block 110 includes a central processing unit (CPU) 112, a memory 114, a system bus 116, etc. The CPU 112 and the memory 114 are connected with each other through the system bus 116. The computer block 110 is connected to the audio driver 120 through the system bus 116. The audio driver 120 includes a controller 122, a buffer 124 and an analog-to-digital ADC and digital-to-analog DAC converter 126. The converter 126 is provided to convert an analog audio signal into a digital signal, or conversely, in response to a control signal from the controller 122. The buffer 124 is composed of a bidirectional buffer for temporarily storing a digital signal applied from the system bus or another digital signal applied from the converter 126 in response to an enable signal from the controller 122. In addition, since the second computer 200 has the same construction as the first computer 100, the detailed description of the connection of the combination of the computer block 210 and the audio driver 220 is omitted for the sake of clarity. Reference numeral 134 represent a speaker for converting an audio signal applied through a speaker line 132 into a voice signal and numeral 144 represents a microphone for converting a voice signal into an analog audio signal and providing the analog audio signal through a microphone line 142 to the microphone input jack 140.

The operation of the audio driver 120 shown in FIG. 2 will now be described as follows. First, it should be noted that the computer block 110 provides an audio digital signal for the audio driver 120 so that a sound signal can be generated through the phone output jack 130, or the computer block 110 stores an audio digital signal from the audio driver 120. For example, an analog audio signal applied through the microphone input jack 130 is converted into a digital signal by the converter 126 in response to the control signal CS from the controller 122. The digital signal is temporarily stored in the buffer 124 in accordance with the enable signal from the controller 122. The stored data in the buffer 124 is applied through the system bus 116 of the first computer 110 to the memory 114 to be stored therein.

When sound is to be generated, however, the data stored in the memory 114 is applied through the system bus 116 to the buffer 124. The stored data in the buffer 124 is converted into an analog audio signal by means of the converter 126. The converted analog signal is then supplied through the phone output jack 130 to the speaker 134 to produce an audible sound.

Figure 3:
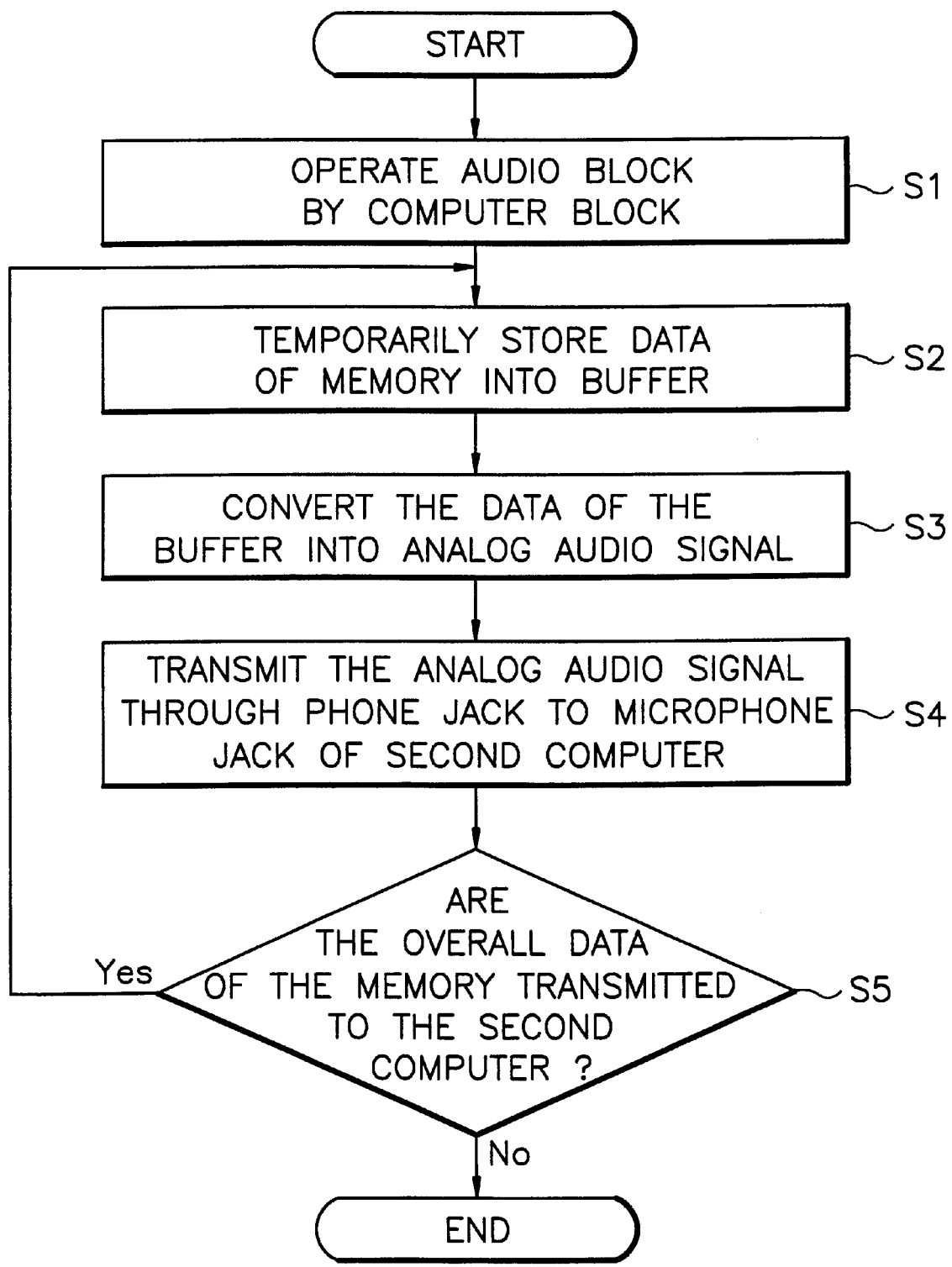
FIG. 3 is a flow chart setting forth a novel method for transmitting data from the first personal computer to the second personal computer using respective audio drivers according to the principles of the present invention.
Figure 4:
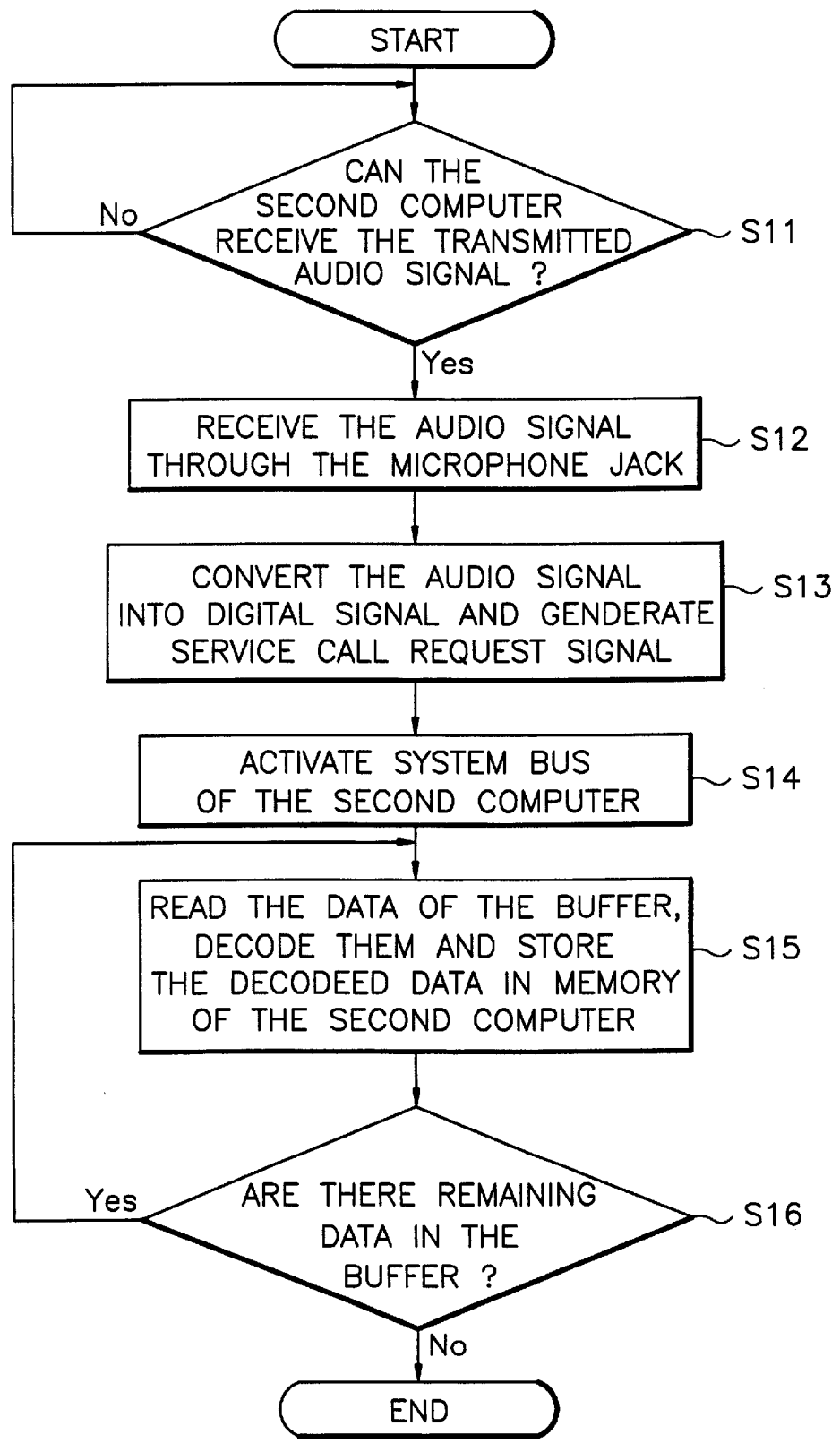
FIG. 4 is a flow chart setting forth a novel method for receiving data from the first personal computer to the second personal computer using respective audio drivers according to the principles of the present invention.

The method for supporting data communication between the personal computers 100 and 200 using the audio drivers 120 and 220 will be hereinafter described with reference to FIGS. 3 and 4. FIG. 3 is a flow chart setting forth a novel method for transmitting data from the first personal computer 100 to the second personal computer 200 using respective audio drivers 120 and 220 according to the principles of the present invention. FIG. 4 is a flow chart setting forth a novel method for receiving data from the first personal computer 100 to the second personal computer 200 using respective audio drivers 120 and 220 according to the principles of the present invention.

First, if the CPU 112 of the first computer 100 performs a data transmitting program as shown in FIG. 3, the data stored in the memory 114 begins to be transmitted from the first computer 100 to the second computer 200. At this time, the computer block 110 activates operation of the audio driver 120 at step S1. Here, it should be noted that if the first computer block 110 of the first computer 100 is operated for beginning data communication with the second computer 200, the second computer block 210 must also be operated to communicate with the first computer 100.

When the audio driver 120 is activated by the computer block 110 of the first computer 100 at step S1, the controller 122 generates an enable signal ES to the buffer 124 for enabling the buffer 124 to temporarily store the data retrieved from the memory 114 and supplied through the system bus 116 at step S2. After the data is stored in the buffer 124, the stored data is converted into an analog audio signal by means of digital-to-analog function of the converter 126 in response to a control signal CS at step S3. After the analog audio signal is produced by the converter 126, the CPU 112 in conjunction with the controller 122 proceeds to step S4 to supply the analog audio signal through the phone output jack 130 to the microphone input jack 240. At this time, the first personal computer 100 determines whether all the stored data in the memory 114 has been completely transmitted to the second personal computer 200. If all the stored data in the memory 114 has been transmitted to the second computer 200, the data transmitting operation of the first personal computer 100 is terminated. But if not, the CPU 112 returns to step S2 so as to supply the stored data in the memory 114 through the system bus 116 to the buffer 124.

Referring now to FIG. 4 which illustrates a data receiving program from the first personal computer 100 to the second personal computer 200 using respective audio drivers according to the principles of the present invention. At step S11, the CPU 212 of the second personal computer 200 determines whether the second personal computer 200 is capable of receiving an audio signal through the microphone input jack 240, that is, whether an audio driver 220 is properly installed and connected to the first personal computer 100 by way of its phone output jack 230 and its microphone input jack 240. When the second personal computer 200 is determined as being capable of receiving the audio signal transmitted from the first personal computer 100, the CPU 212 proceeds to step S12 to control the audio driver 220 to begin receiving the analog audio signal transmitted from the first personal computer 100 through the microphone input jack 240. When the second personal computer is determined as not being capable of receiving the audio signal transmitted from the first personal computer 100, no data communication can be performed until the audio driver 220 of the second personal computer 200 is properly installed and is in a state of readiness to receive the audio signal transmitted from the first personal computer 100.

After the audio signal transmitted from the first personal computer 100 in an analog form is received through the microphone jack S12, the CPU 212 proceeds to step S13 to convert the analog audio signal into a digital signal by means of analog-to-digital function of the converter 226 to be temporarily stored in the buffer 224. Then the controller 222 of the audio driver 220 generates a service call request signal and provides the same to the CPU 212. The service call request signal indicates that the audio driver 220 has received the analog audio signal transmitted through the microphone input jack 240 in order to activate the system bus 216 of the second personal computer 200 at step S14. When the system bus 216 of the second personal computer 200 is activated, the CPU 212 decodes the data read from the buffer 224 and stores the decoded data in the memory 214 of the second personal computer 200 at step S15. The CPU 212 then checks whether there is any digital data remaining in the buffer 224 at step S16. If so, the CPU 212 returns to step S15 to decode remaining digital data. But if not, the data receiving operation of the second personal computer 200 is terminated.

As described above, the present invention advantageously provides a method for supporting data communication between at least two personal computers without the use of a data modem. Existing audio driver which is commonly used to perform audio function is now implemented to advantageously permit data communication between personal computers. As a result, a personal computer having an audio driver incorporated therein is now able to effectively and efficiently communicate with another personal computer having the same audio driver.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for supporting data communication from a first computer system to a second computer system, each of the first and second computer systems having a main computer section for performing computer functions and an audio driver for supporting an audio function, said method comprising the steps of:

activating operation of first and second audio drivers of the respective first and second computer systems;

supplying specific data from the main computer section of the first computer system to be transmitted to the second computer system to the first audio driver in response to a request of data transmission from the first computer system to the second computer system;

temporarily storing the specific data supplied from the main computer section in a first buffer of the first audio driver;

converting the data stored in the first buffer into an analog signal;

transmitting the analog signal through a phone output jack of the first audio driver to a microphone input jack of the second computer system;

determining whether the second audio driver of the second computer system has been activated to receive the analog signal transmitted from the first computer system;

receiving the analog signal transmitted through the microphone input jack, when the second audio driver of the second computer system has been activated;

converting the analog signal received from the microphone input jack into a digital signal;

temporarily storing the digital signal in a second buffer of the second audio driver; and reading the digital signal stored in the second buffer of the second audio driver for transfer into the main computer section of the second computer system, and storing the digital signal read from the second buffer into the main computer section of the second computer system.

2. The method of claim 1, further comprising:

determining whether the specific data stored in the main computer section of the first computer system has been completely transmitted to the second computer system, upon said request of data transmission from the first computer system to the second computer system;

when the specific data stored in the main computer section of the first computer system has been completely transmitted to the second computer system, terminating said data transmission from the first computer system to the second computer system; and alternatively, when the specific data stored in the main computer section of the first computer system has not been completely transmitted to the second computer system, continuing supplying the specific data from the main computer section of the first computer system to the first buffer of the first audio driver for temporarily storage in said first buffer.

3. The method of claim 1, further comprising:

determining whether the digital signal temporarily stored in the second buffer of the second computer system has been completely read from the second buffer for permanent storage in the main computer section of the second computer system;

when the digital signal temporarily stored in the second buffer has been completely read from the second buffer, terminating reading of the digital signal temporarily stored in the second buffer; and alternatively, when the digital signal temporarily stored in the second buffer has not been completely read from the second buffer, continuing reading of the digital signal temporarily stored in the second buffer for permanent storage in the main computer section of the second computer system.

4. The method of claim 1, wherein the data stored in the first buffer is converted into an analog signal for transmission through the phone output jack of the first audio driver by a digital-to-analog converter included in the first audio driver of the first computer system.

5. The method of claim 4, further comprised of said first buffer corresponding to a bidirectional buffer having a first data port coupled to a system bus of the main computer section of the first computer system, and a second data port coupled to the digital-to-analog converter included in the first audio driver of the first computer system.

6. The method of claim 1, wherein the analog signal received from the microphone input jack of the second computer system is converted into a digital signal for temporary storage in the second buffer by an analog-to-digital converter included in the second audio driver of the second computer system.

7. The method of claim 6, further comprised of said second buffer corresponding to a bidirectional buffer having a first data port coupled to a system bus of the main computer section of the second computer system, and a second data port coupled to the analog-to-digital converter included in the second audio driver of the second computer system.

8. The method of claim 5, further comprised of said first audio driver of the first computer system including a dedicated controller for controlling operation of the first buffer and the digital-to-analog converter for data transmission to the second computer system.

9. The method of claim 7, further comprised of said second audio driver of the second computer system including a dedicated controller for controlling operation of the second buffer and the analog-to-digital converter for data reception from the first computer system.

10. A data communication system, comprising:
    a first computer system including:
        a first processor for controlling operation of said first computer system;
        a first memory for storing information data specific to said first computer system;
        a first audio driver operatively connected to said first processor and said first memory by a first system bus, for performing an audio function and permitting data communication with a second computer system through each respective phone output jack and microphone input jack, said first audio driver including a first dedicated controller for controlling the transfer of information data into and out of said first audio driver, a first data converter for providing one of an analog-to-digital and digital-to-analog conversion of the information data according to the transfer of information data into and out of said first audio driver, and a first bidirectional buffer connected between said first system bus and said first data converter for temporarily storing information data supplied from one of said first memory and said first data converter; and
    said second computer system operatively connected to said first computer system through each respective phone output jack and microphone input jack, said second computer system including:
        a second processor for controlling operation of said second computer system;
        a second memory for storing information data specific to said second computer system; and
        a second audio driver operatively connected to said second processor and said second memory by a second system bus, for performing an audio function and permitting data communication with said first computer system through each respective phone output jack and microphone input jack, said second audio driver including a second dedicated controller for controlling the transfer of information data into and out of said second audio driver, a second data converter for providing one of an analog-to-digital and digital-to-analog conversion of the information data according to the transfer of information data into and out of said second audio driver, and a second bidirectional buffer connected between said second system bus and said second data converter for temporarily storing information data supplied from one of said second memory and said second data converter.

11. The data communication system of claim 10, further comprised of said first audio driver of said first computer system communicating with said second audio driver of said second computer system through each respective phone output jack and microphone input jack under control of said first processor by:
    activating operation of first and second audio drivers of the respective first and second computer systems;
    supplying specific information data from said first memory of said first computer system to be transmitted to said second computer system to said first audio driver in response to a request of data transmission from said first computer system to said second computer system;
    temporarily storing the specific information data supplied from said first memory into said first bidirectional buffer of the first audio driver;
    converting the information data stored in the first directional buffer into an analog format by said first data converter;
    transmitting the information data in an analog format through the phone output jack of said first audio driver to the microphone input jack of said second computer system;
    determining whether said second audio driver of said second computer system has been activated to receive the information data in an analog format transmitted from said first computer system;
    receiving the information data in an analog format transmitted through the microphone input jack by said second computer system under control of said second processor, when said second audio driver of said second computer system has been activated;
    converting the information data in an analog format received from the microphone input jack back into a digital format by said second data converter;
    temporarily storing the information data in a digital format in said second bidirectional buffer of said second audio driver; and
    reading the information data stored in the second bidirectional buffer of said second audio driver for transfer into said second memory of said second computer system, and storing the information data read from said second bidirectional buffer into said second memory of said second computer system.

12. The data communication system of claim 10, further comprised of said first processor of said first computer system:
    determining whether the specific information data stored in said first memory of said first computer system has been completely transmitted to said second computer system, upon said request of data transmission from said first computer system to said second computer system;

when the specific information data stored in said first memory has been completely transmitted to said second computer system, terminating said data transmission from said first computer system to said second computer system; and alternatively, when the specific information data stored in said first memory has not been completely transmitted to said second computer system, continuing supplying the specific information data from said first memory to said first bidirectional buffer of said first audio driver for temporarily storage in said first bidirectional buffer.

13. The data communication system of claim 10, further comprised of said second processor of said second computer system:

determining whether the information data in a digital format temporarily stored in said second bidirectional buffer of said second computer system has been completely read from said second bidirectional buffer for permanent storage in said second memory of said second computer system;

when the information data in a digital format temporarily stored in said second bidirectional buffer has been completely read from said second bidirectional buffer, terminating reading of the information data temporarily stored in said second bidirectional buffer; and alternatively, when the information data in said digital format temporarily stored in said second bidirectional buffer has not been completely read from said second bidirectional buffer, continuing reading of the information data in said digital format temporarily stored in said second bidirectional buffer for permanent storage in said second memory of said second computer system.

14. A computer system, comprising:

a processor for controlling operation of said computer system;

a memory for storing information data specific to said computer system;

a phone output jack;

a microphone input jack;

an audio driver operatively connected to said processor and said memory by a system bus, for performing an audio function and permitting data communication with another computer system through the respective phone output jack and microphone input jack, said audio driver including:

a dedicated controller for controlling the transfer of information data into and out of said audio driver;

a data converter operatively connected to said phone output jack and said microphone input jack, for providing one of an analog-to-digital and digital-to-analog conversion of the information data according to the transfer of information data into and out of said audio driver; and a bidirectional buffer having a first data port coupled to said system bus and a second data port coupled to said data converter, for temporarily storing information data supplied from one of said memory and said data converter.

* * * * *